United States Patent
Komsi

(10) Patent No.: US 9,992,440 B2
(45) Date of Patent: Jun. 5, 2018

(54) METHOD, APPARATUS AND COMPUTER PROGRAM PRODUCT FOR CONFIGURATION OF A DISPLAY SCREEN

(75) Inventor: Asko M. Komsi, Menlo Park, CA (US)

(73) Assignee: Nokia Technologies Oy, Espoo (FI)

( * ) Notice: Subject to any disclaimer, the term of this patent is extended or adjusted under 35 U.S.C. 154(b) by 1975 days.

(21) Appl. No.: 12/331,971

(22) Filed: Dec. 10, 2008

(65) Prior Publication Data
US 2010/0146555 A1    Jun. 10, 2010

(51) Int. Cl.
| | |
|---|---|
| H04N 21/41 | (2011.01) |
| H04N 21/414 | (2011.01) |
| H04N 5/445 | (2011.01) |
| H04N 21/462 | (2011.01) |
| H04N 21/443 | (2011.01) |
| H04N 21/478 | (2011.01) |
| H04N 21/485 | (2011.01) |
| H04N 21/81 | (2011.01) |

(52) U.S. Cl.
CPC ..... *H04N 5/44591* (2013.01); *H04N 21/4438* (2013.01); *H04N 21/4622* (2013.01); *H04N 21/478* (2013.01); *H04N 21/485* (2013.01); *H04N 21/8173* (2013.01)

(58) Field of Classification Search
CPC ............. H04N 21/4821; H04N 21/458; H04N 21/42224; H04N 21/4227; H04N 21/4126; H04N 21/41407
USPC .......................................................... 715/864
See application file for complete search history.

(56) References Cited

U.S. PATENT DOCUMENTS

| | | | |
|---|---|---|---|
| 2002/0049978 A1* | 4/2002 | Rodriguez et al. | 725/86 |
| 2003/0005447 A1* | 1/2003 | Rodriguez | 725/51 |
| 2005/0223394 A1 | 10/2005 | Keohane et al. | |

(Continued)

FOREIGN PATENT DOCUMENTS

| | | |
|---|---|---|
| CN | 1717080 A | 1/2006 |
| CN | 1916843 A | 2/2007 |

(Continued)

OTHER PUBLICATIONS

International Search Report and Written Opinion of corresponding International App. No. PCT/FI2009/050950 dated Apr. 22, 2010, pp. 1-17.

(Continued)

*Primary Examiner* — Tadesse Hailu
(74) *Attorney, Agent, or Firm* — Ditthavong & Steiner, P.C.

(57) ABSTRACT

A method, apparatus and computer program product are provided to facilitate the configuration of a display screen, such as an idle screen, a home screen, etc. The method provides for presentation of a setup screen defining a plurality of display channels and a time scale for the display channels. The method also receives an indication of a user interface component configured to generate information to be presented in a respective display channel commencing at a respective time. Further, the method provides for presentation of a display screen that includes a plurality of display channels and further includes information generated by the user interface component in the respective display channel commencing at the respective time. A corresponding apparatus and computer program product are also provided.

18 Claims, 7 Drawing Sheets

(56) References Cited

U.S. PATENT DOCUMENTS

| | | | |
|---|---|---|---|
| 2005/0283734 A1* | 12/2005 | Santoro et al. | 715/765 |
| 2006/0020905 A1* | 1/2006 | Wroblewski | 715/860 |
| 2006/0123359 A1* | 6/2006 | Schatzberger | 715/810 |
| 2006/0148528 A1* | 7/2006 | Jung et al. | 455/566 |
| 2006/0156256 A1* | 7/2006 | Lee | 715/857 |
| 2006/0177028 A1* | 8/2006 | Vermola | 379/93.28 |
| 2006/0212906 A1* | 9/2006 | Cantalini | 725/62 |
| 2006/0290661 A1* | 12/2006 | Innanen et al. | 345/156 |
| 2007/0060205 A1* | 3/2007 | Kim | 455/566 |
| 2007/0094690 A1* | 4/2007 | Rodriguez et al. | 725/58 |
| 2007/0256034 A1 | 11/2007 | Hiraoka et al. | |
| 2008/0016438 A1* | 1/2008 | Choi | 715/256 |
| 2008/0016444 A1* | 1/2008 | Choi | 715/710 |
| 2008/0092081 A1* | 4/2008 | Jong et al. | 715/840 |
| 2008/0235602 A1* | 9/2008 | Strauss et al. | 715/762 |
| 2008/0294998 A1* | 11/2008 | Pyhalammi et al. | 715/748 |
| 2009/0070708 A1 | 3/2009 | Finkelstein | |
| 2009/0199124 A1* | 8/2009 | Birch | 715/772 |
| 2009/0216634 A1* | 8/2009 | Peltonen et al. | 705/14 |
| 2010/0017825 A1* | 1/2010 | Shin et al. | 725/47 |
| 2010/0105440 A1* | 4/2010 | Kruzeniski et al. | 455/566 |
| 2010/0138295 A1* | 6/2010 | Caron et al. | 705/14.49 |

FOREIGN PATENT DOCUMENTS

| | | | |
|---|---|---|---|
| EP | 1 798 632 | A1 | 6/2007 |
| EP | 1 855 186 | A2 | 11/2007 |
| EP | 1 874 013 | A1 | 1/2008 |
| EP | 2 076 001 | A1 | 7/2009 |
| EP | 2 120 142 | A2 | 11/2009 |
| KR | 100861656 | B1 | 10/2008 |

OTHER PUBLICATIONS

Notification of the First Office Action for related Chinese Patent Application No. 200980149882.5 dated Jun. 21, 2013.

Chinese Office Action with English Language Summary for corresponding Patent Application No. 200980149882.5 dated Nov. 12, 2013, 13 pages.

Chinese Office Action with English Language Summary for corresponding Chinese Patent Application No. 200980149882.5 dated Jan. 16, 2014, 14 pages.

Office Action for corresponding Chinese Patent Application No. 200980149882.5 dated Dec. 30, 2016, with English-language summary, 18 Pages.

Chinese Office Action for corresponding Chinese Application No. 200980149882.5, dated Jun. 18, 2014, with English Language Summary, 14 pages.

Office Action for corresponding Indian Patent Application No. 4813/CHENP/2011, dated Feb. 28, 2018, 7 pages.

* cited by examiner

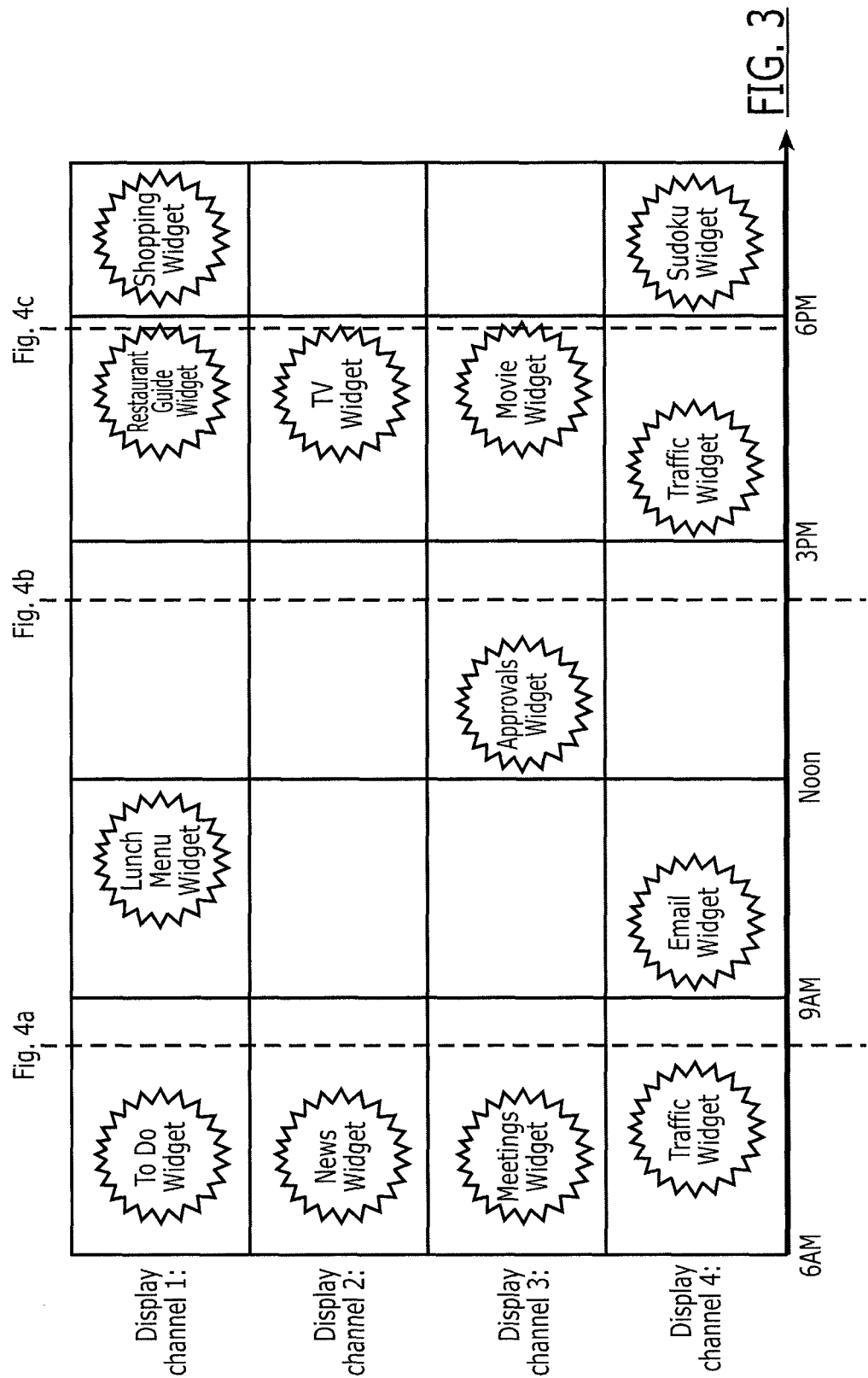

METHOD, APPARATUS AND COMPUTER PROGRAM PRODUCT FOR CONFIGURATION OF A DISPLAY SCREEN

TECHNOLOGICAL FIELD

Embodiments of the present invention relate generally to the configuration of a display screen and, more particularly, to the selective incorporation of user interface components within a display screen, such as a home screen, an idle screen or the like.

BACKGROUND OF THE INVENTION

Many computing devices, including mobile computing devices such as mobile telephones, personal digital assistant (PDA) or the like, present an idle screen or home screen in certain circumstances, such as upon initially logging onto the computing device, in the absence of the execution of any specific application, at the direction of the user, etc. An idle screen or a home screen may simply display a plurality of icons associated with various applications, documents or the like to facilitate access to the applications, documents, or the like by the user.

Although active idle screens and home screens incorporating various user interface components, such as the user interfaces of one or more widgets, provide more convenient access for a user to various applications or services that are concurrently executing, it would be desirable to provide greater configurability of the idle screens or home screens and to permit such idle screens or home screens to be more robust and relevant by presenting even more relevant information to the user.

BRIEF SUMMARY OF THE INVENTION

Methods, apparatus and computer program products are therefore provided according to embodiments of the present invention to facilitate the configuration of a display screen, such as an idle screen, a home screen or the like. In this regard, embodiments of the present invention permit various user interface components to be associated with different display channels of the display screen. Additionally, embodiments of the present invention permit different user interface components to be associated with the same display channel at different times. As such, a display screen may be configured in accordance with embodiments of the present invention such that information that is relevant at one point in time is provided by the selected user interface components with the types of information that are presented by the display screen configured to change over the course of time, such as in instances in which a user values different types of information at one time than during another.

According to one embodiment, a method is provided that provides for presentation of a setup screen defining a plurality of display channels and a time scale for the display channels. The method of this embodiment also receives an indication of a user interface component, such as a widget, configured to generate information to be presented in a respective display channel commencing at a respective time. Further, the method of this embodiment provides for presentation of a display screen that includes a plurality of display channels and further includes information generated by the user interface component in the respective display channel commencing at the respective time.

An apparatus is also provided according to another embodiment of the present invention that includes a processor configured to provide for presentation of a setup screen defining a plurality of display channels and a time scale for the display channels. The processor of this embodiment is also configured to receive an indication of a user interface component, such as a widget, configured to generate information to be presented in a respective display channel commencing at a respective time and to provide for presentation of a display screen comprising the plurality of display channels and including information generated by the user interface component in the respective display channel commencing at the respective time.

In a further embodiment, a computer program product is provided that includes at least one computer-readable storage medium having computer-executable program instructions stored therein. The computer-executable program instructions include a program instruction configured to provide for presentation of a setup screen defining a plurality of display channels and a time scale for the display channels. The computer-executable program instructions also include a program instruction configured to receive an indication of a user interface component, such as a widget, configured to generate information to be presented in a respective display channel commencing at a respective time and a program instruction configured to provide for presentation of a display screen comprising the plurality of display channels including information generated by the user interface component in the respective display channel commencing at the respective time.

In one embodiment, the indication of a user interface component that is received includes indications of one or more user interface components to be presented in the same display channel commencing at different times. Additionally or alternatively, the indication of a user interface component that is received may include instructions for information generated by the user interface component to be repeatedly presented in a respective display channel at a predefined time interval. Further, the presentation of the display screen may include information generated by the user interface component in the respective display channel commencing at the respective time and continuing until the information generated by the user interface component is replaced in the respective display channel by information generated by another user interface component.

In one embodiment, the presentation of the setup screen includes, for each of the plurality of display channels, the presentation of a graphical representation of a location of the respective display channel upon the display screen. In this embodiment, instructions may also be received to alter a size of a respective display channel upon the display screen. In this regard, the instructions to alter the size of the respective display channel may include input that is received via the setup screen to alter the graphical representation of the location of the respective display channel.

The above summary is provided merely for purposes of summarizing some example embodiments of the invention so as to provide a basic understanding of some aspects of the invention. Accordingly, it will be appreciated that the above-described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 3 is a representation of a setup screen in accordance with one example embodiment of the present invention;

DETAILED DESCRIPTION OF THE INVENTION

Figure 1:
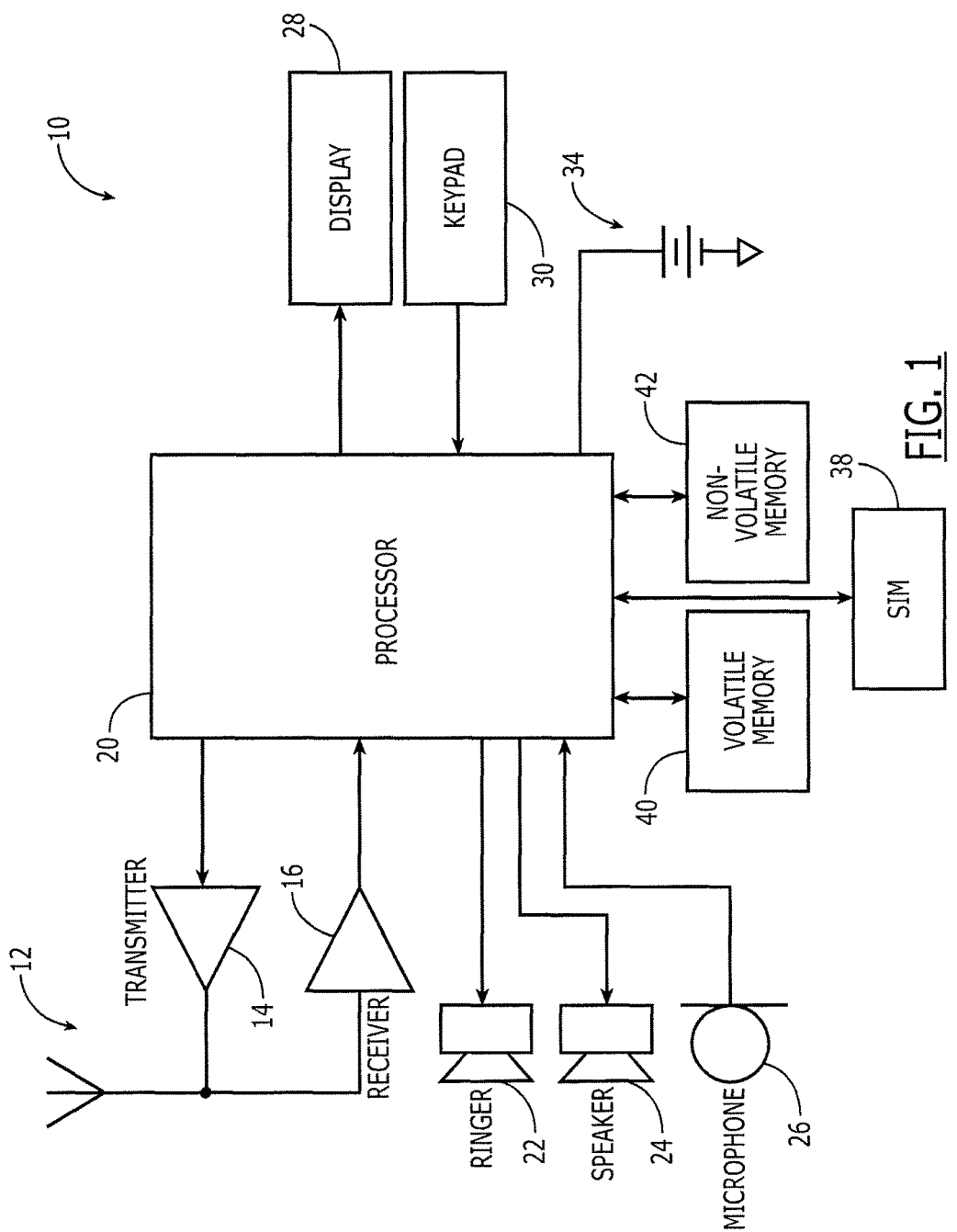
FIG. 1 is a schematic block diagram of a user terminal according to example embodiments of the present invention.

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Methods, apparatus and computer program products are therefore provided for facilitating the configuration of a display screen, such as an idle screen, a home screen or the like. In one embodiment, the methods, apparatus and computer program products permit one or more user interface components, such as one or more widgets, to be selectively assigned to respective display channels of the display screen. Additionally, the methods, apparatus and computer program products of this embodiment permit the user interface components, such as widgets, to be selectively displayed within the respective display channels during predetermined times. As such, different user interface components may be displayed within the same display channel at different times, thereby permitting the configuration of the display screen in a manner that may provide more relevant information during each of a number of different times.

The methods, apparatus and computer program products of embodiments of the present invention may be embodied by any of a variety of computing devices including personal computers, computer workstations, portable computing devices, etc. For example, FIG. 1, a schematic block diagram of a user terminal according to example embodiments of the present invention, illustrates a block diagram of a user terminal 10 that may benefit from embodiments of the present invention. It should be understood, however, that the user terminal 10 as illustrated and hereinafter described is merely illustrative of one type of device that may benefit from embodiments of the present invention and, therefore, should not be taken to limit the scope of embodiments of the present invention. While one embodiment of the user terminal 10 is illustrated and will be hereinafter described for purposes of example, other types of wireless, wireline, mobile and/or fixed user terminals, such as mobile user terminals, portable digital assistants (PDAs), pagers, mobile computers, televisions, radios, gaming devices, laptop computers, cameras, camcorders, audio/video recorders and players, global positioning system (GPS) devices, mobile telephones, house hold appliances, any combination of the aforementioned, and/or other types of voice and text communications systems, can readily employ embodiments of the present invention. Furthermore and as noted above, devices that are not mobile may also readily employ embodiments of the present invention.

The user terminal 10 of the illustrated embodiment includes an antenna 12 (or multiple antennas) in operable communication with a transmitter 14 and a receiver 16. The user terminal 10 may further include an apparatus, such as a processor 20 that may provide signals to and receive signals from the transmitter 14 and receiver 16, respectively. The signals may include signaling information in accordance with the air interface standard of the applicable cellular system, and/or may also include data corresponding to speech, received data and/or user generated/transmitted data. In this regard, the user terminal 10 may be capable of operating with one or more air interface standards, communication protocols, modulation types, and access types. By way of illustration, the user terminal 10 may be capable of operating in accordance with any of a number of first, second, third and/or fourth-generation communication protocols or the like. For example, the user terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols and/or the like. As an alternative (or additionally), the user terminal 10 may be capable of operating in accordance with non-cellular communication mechanisms. For example, the user terminal 10 may be capable of communication in a wireless local area network (WLAN) or other communication networks.

The processor 20 may include circuitry implementing, among others, audio and logic functions of the user terminal 10. As such, the processor may be embodied in a number of different ways. For example, the processor may be embodied as various processing means including any device or circuitry embodied in hardware, software or a combination of hardware and software that is configured to perform the corresponding functions, such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor may be configured to execute instructions stored in a memory device or otherwise accessible to the processor. In one embodiment, the processor 20 may comprise a digital signal processor device, a microprocessor device, and various analog to digital converters, digital to analog converters, and/or other support circuits. Control and signal processing functions of the user terminal 10 may be allocated between these devices according to their respective capabilities. The processor 20 may also support other functionality for use in encoding, receiving and/or transmitting messages. Further, the processor 20 may include functionality to operate one or more software programs, which may be stored in memory. For example, the processor 20 may be capable of operating a connectivity program, such as a conventional web browser. The connectivity program may then allow the user terminal 10 to transmit and receive web content, such as location-based content and/or other web page content, according to a Wireless Application Protocol (WAP), Hypertext Transfer Protocol (HTTP) and/or the like, for example.

The user terminal 10 may also comprise a user interface including an output device such as an earphone or speaker 24, a ringer 22, a microphone 26, a display 28, and a user input interface, which may be operationally coupled to the processor 20. The user input interface, which allows the user terminal 10 to receive data, may include any of a number of devices allowing the user terminal 10 to receive data, such as a keypad 30, a touch display (not shown) or other input device. In embodiments including the keypad 30, the keypad 30 may include numeric (0-9) and related keys (#, *), and other hard and soft keys used for operating the user terminal 10. Alternatively, the keypad 30 may include a QWERTY keypad arrangement. The keypad 30 may also include various soft keys with associated functions. In addition, or alternatively, the user terminal 10 may include an interface device such as a joystick or other user input interface. The user terminal 10 may further include a battery 34, such as a vibrating battery pack, for powering various circuits that are used to operate the user terminal 10, as well as optionally providing mechanical vibration as a detectable output. The display 28 may be such as a touch display or touch screen allowing user input by touch manner.

The user terminal 10 may further include a user identity module (UIM) 38, which may generically be referred to as a smart card. The UIM 38 of one embodiment is a memory device having a processor built in. The UIM 38 may include, for example, a subscriber identity module (SIM), a universal integrated circuit card (UICC), a universal subscriber identity module (USIM), a removable user identity module (R-UIM), or any other smart card. In addition to the UIM 38, the user terminal 10 may be equipped with memory. For example, the user terminal 10 may include volatile memory 40, such as volatile Random Access Memory (RAM) including a cache area for the temporary storage of data. The user terminal 10 may also include other non-volatile memory 42, which may be embedded and/or may be removable. The non-volatile memory 42 may additionally or alternatively comprise an electrically erasable programmable read only memory (EEPROM), flash memory, other non-volatile RAM (NVRAM) or the like. Non-volatile memory 40 may also include a cache area for the temporary storage of data. The memories may store any of a number of pieces of information, and data, used by the user terminal 10 to implement the functions of the user terminal 10. For example, the non-volatile memory may be configured to buffer input data for processing by the processor. Additionally or alternatively, the memories may be configured to store instructions for execution by the processor.

Figure 2:
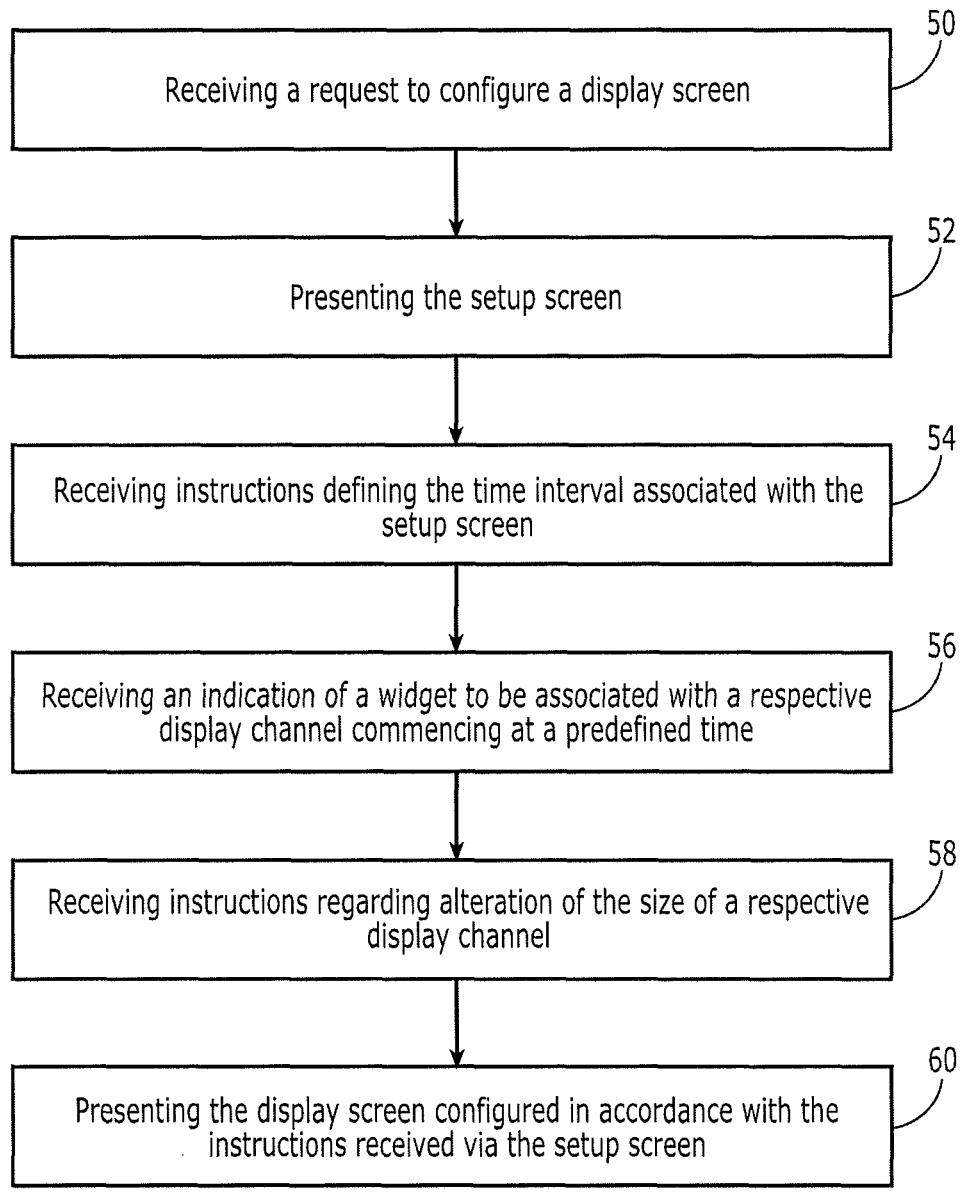
FIG. 2 is a flow chart illustrating various operations in accordance with one example embodiment of the present invention.

As depicted in operation 50 of the flow chart depicted in FIG. 2, in accordance with one example embodiment of the present invention, a computing device, such as the user terminal 10 of FIG. 1, and, the processor 20 of the computing device, may receive a request from a user via the user input interface to configure a display screen, such as an idle screen, a home screen or any application user interface. This request may be received from the user in an unsolicited manner or in response to a prompt provided to the user by the computing device via the display inquiring as to whether the user wishes to configure the display screen or otherwise reminding the user of the opportunity to configure the display screen. In response to the request to configure the display screen, the processor can direct the display 28 to present a setup screen to facilitate the configuration of the display screen. See operation 52. The setup screen may be configured in a variety of different manners, but one embodiment of a setup screen is depicted in FIG. 3 for purposes of illustration, but not of limitation. As shown in FIG. 3, a setup screen may define a plurality of display channels, such as display channel 1, display channel 2, display channel 3 and display channel 4 in the illustrated embodiment. Each display channel represents a designated portion of the display screen or some other output or user interface device, such as the audio output provided by speakers. For example, the display screen may be broken into four equal quadrants, such as 2×2 grid, that is, the upper left, the upper right, the lower left and the lower right quadrants that may be referenced as display channel 1, display channel 2, display channel 3 and display channel 4, respectively. However, the display screen may be divided into any number of display channels and respective areas, for example, 2×4 or 3×3 grids, and the various display channels and the respective areas can arranged in various manners and may be of any size and form such that not all display channels need be of the size or form. Moreover, not all of the display channels need be visible upon the display screen at any one time. Instead, more display channels may be defined than are to be presented upon the display screen at any one time. As such, the display screen may be configured to present some of the display channels at one time and others of the display channels at another time. For example, the display screen may be configured to scroll through the plurality of display channels or a user may provide input, such as via a touch screen, indicating that the display screen should present a different set of display channels. As noted above, the display channel need not be visual and may, instead, be an audio or other form of output.

As such, prior to presentation of the setup screen, the display screen of one embodiment was divided into the respective display channels with the size and location of each display channel defined. This definition of the display channels may be provided by user input, such as upon initial actuation of the computing device, or may be predefined by a system administrator, by the manufacturer of the computing device or in some other fashion. The definition of the display channels including the number of display channels, the size and form of the display channels and the location of the display channels may be stored in memory 40 and may be accessible by the processor 20, such as in response to a request for the presentation of a setup screen, in order to permit the processor to determine the number of display channels to be included in the setup screen.

As described below, however, the user may redefine one or more display channels following their initial definition, such as by permitting a user to resize one or more display channels. Although embodiments of the present invention permit resizing of the display channels by the user in conjunction with the definition of the content of the display channels as described below, methods, apparatus and computer program products of other embodiments of the present invention may permit further redefinition of the display channels including a redefinition of the number of display channels, the locations of the display channels, the size and form of the display channels and the like, in a manner that is either part of the process of defining the content to be displayed within the display channels or an independent process.

In addition to the plurality of display channels, the setup screen that is displayed by the processor 20 also defines a time scale or a time line. While the time scale may be represented in various manners, the time scale of one embodiment defines a plurality of sequential time periods. In the illustrated embodiment, the time periods are three hour blocks beginning with 6 AM to 9 AM and then continuing with 9 AM to noon, noon to 3 PM, 3 PM to 6 PM and so on. While three hour time periods are depicted in the illustrated embodiment of the setup screen, other time periods may be utilized including shorter or longer time periods and time periods that need not be uniform, such as shorter and more granular time periods during some portions of the day, such as during the work day, and longer and more expansive time periods during other portions of the day, such as overnight. Also, while the setup screen of the illustrated embodiment includes a common time scale with the same time periods for each of the display channels, the display channels may each have a respective time scale and, in embodiments in which the time scales are divided into time periods, the time periods associated with one display channel may either be the same or different than the time periods associated with the other display channels. The time scales, including any time periods, may also be predefined or may be defined based upon user input. In either instance, the definition of the time scales, including any time periods, may be stored in memory 40 and may be accessible by the processor, such as in response to a request for the presentation of a setup screen, in order to permit the processor to determine the time scale(s) to be included in the setup screen.

In response to the display of the setup screen, a user interface component may be associated with a respective display channel beginning at a respective time in accordance with embodiments of the present invention. In this regard, a particular time of a respective display channel may be selected from the setup screen, such as by the selection of a cursor that has been placed at the respective time within the display channel by a user, and a user interface component may then be identified for association with the respective display channel beginning at the respective time. Various types of user interface components may be associated with a respective display channel, but one example of a user interface component is a widget, which will be discussed below by way of example, but not of limitation. A widget may generically reference the user interface generated by one or more applications or services that are currently active. Widgets may include the user interfaces of a wide variety of applications or services, such as the user interfaces of an email application, a calendar application, a calculator application, a dictionary application, a flight tracker application, a stock market tracker application, or the like. A widget may be identified in a variety of manners. For example, a list of widget candidates can be presented either in response to the selection of a respective time within a respective display channel or on a more permanent basis in another window proximate the setup screen. In either instance, a user may select a particular widget, such as from the listing of candidate widgets, for example from a pop up screen, for association with the particular time within the selected display channel. Alternatively, the name or other identifier of a widget may be entered following or otherwise in association with the selection of the particular time within the respective display channel. Regardless of the manner in which the widget is selected, the processor 20 may receive and record the selection, such as by storing the selection in memory 40, and update the setup screen to include a designation of the selected widget at the respective time of the respective display channel. See operation 56 of FIG. 2. The processor may also be configured to permit a user to repeatedly select different times within the same or different display channels and to associate widgets therewith in an efficient and intuitive manner. Further, the processor may also be configured to permit the user to drag and drop the widget from one channel to another channel, and/or to a different location relative to the time scale.

As shown in FIG. 3, a widget need not be provided for each time period for each display channel. Instead, in one embodiment, a widget that is associated with an earlier time will continue to be valid, such as during each subsequent time period, even if the user does not separately indicate that the same widget is to be associated with each subsequent time period of the same display channel, until a different widget is associated with a subsequent time for the same display channel. With reference to FIG. 3 by way of example, the News widget is associated with the time period beginning at 6 AM for display channel 2 with no other widget being associated with any time period of display channel 2 until about 5 PM at which time the TV widget is associated with display channel 2. As such, in this embodiment, the News widget that is associated with the time period beginning at 6 AM will be valid from 6 AM until replaced by the News widget at about 5 PM. Alternatively, a widget may be defined to have a predefined duration with the respective display channel becoming vacant or being replaced by another display channel if the predefined duration of the widget expires prior to the activation of another widget within the same display channel.

Additionally, the widgets may be defined so as to repeat at a predefined time interval. For example, the setup screen depicted in FIG. 3 may be a setup screen associated with every Monday such that the widgets that are associated with different times for the different display channels will be repeated every seven days, that is, on every Monday. Alternatively, the setup screen may be associated, not just with Monday, but with every day such that the widgets associated with the different times for the different display channels will be repeated on a daily basis. Other time intervals may also be defined including both shorter and longer time intervals, if so desired. In one embodiment, a user may be permitted to define the time interval, if any, at which the widgets will repeat, such as by designating a setup screen to be associated with a certain day, every weekday, everyday or the like. See, for example, operation 54 of FIG. 2. The processor 20, in turn, may be configured to store, such as in memory 40, the time interval, if any, at which the widgets will repeat.

Once a user has completed the configuration of the display screen via the setup screen by associating widgets with respective times for each of the display channels that are of interest, the user may provide and the processor 20 may receive a signal indicative of the completion of the configuration process. The setup screen may then be removed from the display 28 and the processor may store the substance of the setup screen including the association of the various widgets with the different times within the various display channels and any interval at which the various widgets are to be repeated. Thereafter, during operation of the computing device and upon the presentation of the display screen, such as an idle screen, a home screen or the like, the processor may configure the display screen defined pursuant to the setup screen. See operation 60 of FIG. 2. In this regard, the processor may determine the current time, the number, placement and size of the display channels at the current time as well as the widget associated with each display channel at the current time. If any widget associated with a display channel at the current time is not already executing, the processor may also launch or otherwise activate the widget.

Figure 4A:
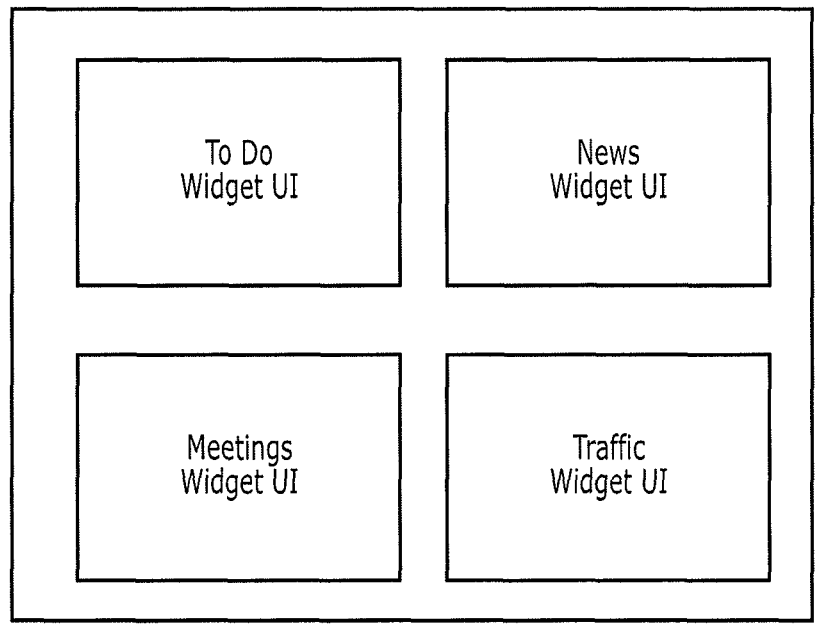
FIGS. 4a-4c are representations of a display screen at 8:00 AM, 2:00 PM, and 5:30 PM that are configured with information provided by various widgets as defined by the setup screen of FIG. 3 in accordance with one example embodiment of the present invention.
Figure 4B:
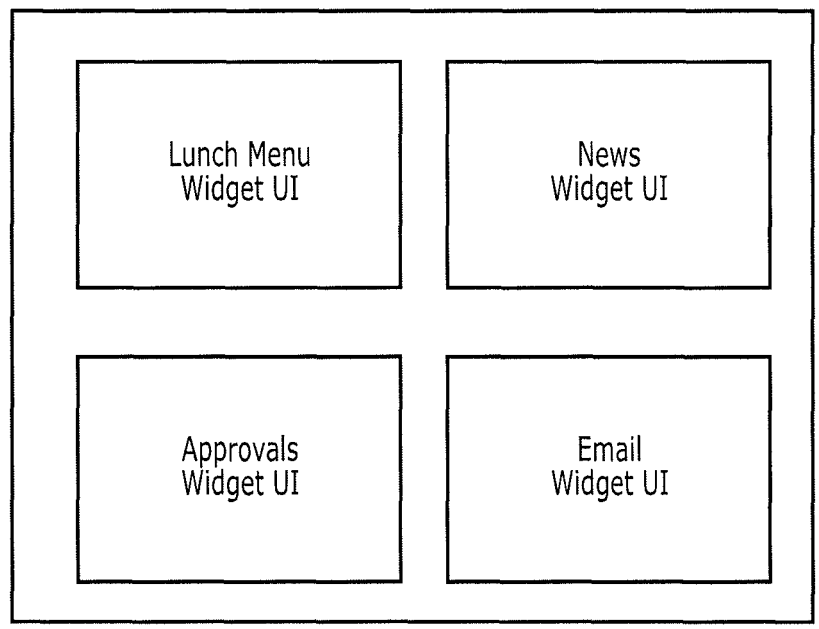
Figure 4C:
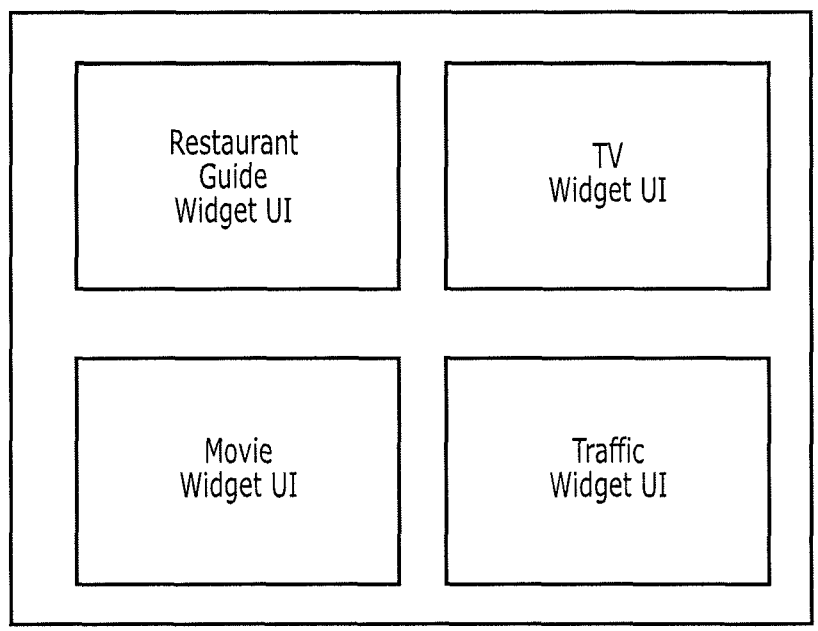

Within each display channel of the display screen, the processor 20 may then display the user interface generated by the widget that has been associated with the respective display channel at the current time. In one example in which the display screen has four display channels positioned in four equal quadrants that have been configured in the manner defined by the setup screen of FIG. 3, the processor may provide for the presentation of a display screen at 8 AM as shown in FIG. 4a, illustrating one example embodiment of the invention. As shown, the user interface (UI) of the To Do widget may be presented in the first display channel, that is, the upper left display channel, the UI of the News widget may be displayed in the second display channel, that is, the upper right display channel, the UI of the Meetings widget may be displayed in the third display channel, that is, the lower left display channel and the UI of the Traffic widget may be displayed in fourth display channel, that is, the lower right display channel. As such, a user viewing the display screen may readily determine the status and other information provided via the user interface of the selected widgets. As a result of the selection and association of different widgets with the display channels at different times, the processor can provide for a differently configured display screen at 2 PM as shown in FIG. 4b, illustrating one example embodiment of the invention, with the UI of the Lunch Menu widget replacing the UI of the To Do widget in the first display channel, the UI of the Approvals widget replacing the UI of the Meetings widget in the third display channel and the UI of the Email widget replacing the UI of the Traffic widget in the fourth display channel as a result of the association of the Lunch Menus widget with first display channel beginning at about 11 AM, the Approvals widget with the third display channel beginning at about noon and the Email widget with the fourth display channel beginning at about 9 AM. By way of further example and based upon the setup screen of FIG. 3, the processor may present the display screen depicted in FIG. 4c, illustrating one example embodiment of the invention, beginning at about 5:30 PM in which the UI of the Restaurant Guide widget is displayed in the first display channel, the UI of the TV widget is displayed in the second display channel, the UI of the Movie widget is displayed in the third display channel and the UI of the Traffic widget is displayed in the fourth display channel. As such, the configurability of the display screen permits a user to have the most relevant information displayed at different portions of time with the recognition that the most relevant types of information may change over the course of the day or other time period. For example, movie listings may be more relevant in the evening as shown in FIG. 4c and a calendar of activities may be more relevant during the morning hours as shown in FIG. 4a.

Figure 5:
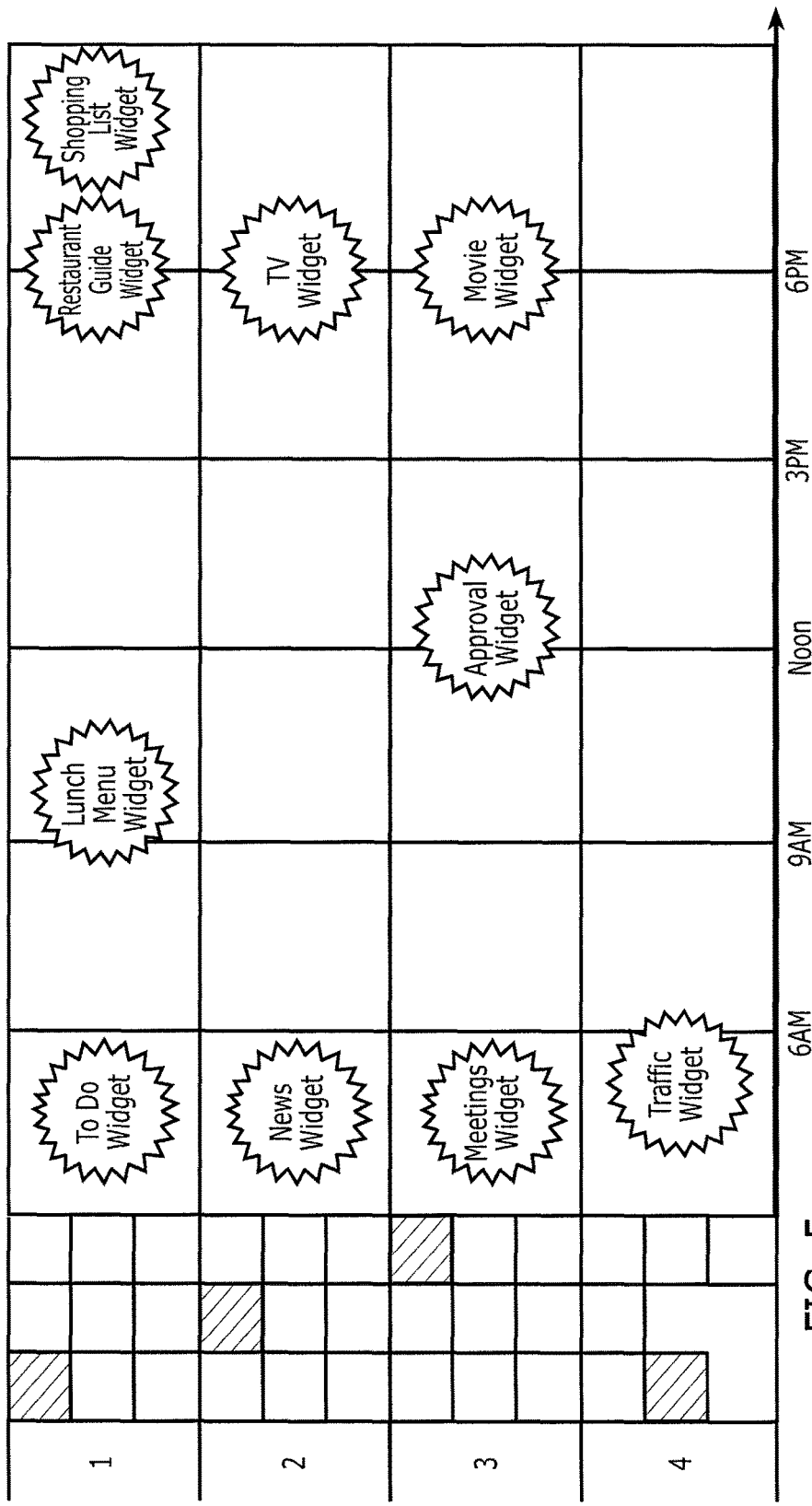
FIG. 5 is a representation of another setup screen according to one example embodiment of the present invention.

In addition to merely listing the different display channels, the processor 20 may configure the setup screen to include a graphical representation of the relative location and, in some instances, the size of the respective display channel such that a user can more easily take into account and visualize the location of the information to be presented by a widget that is associated with the respective display channel. By way of example, FIG. 5, illustrating one example embodiment of the invention, depicts a setup screen for display channels 1, 2, 3 and 4 of a display screen that may have up to nine display channels arranged in a checkerboard fashion. The pattern defined by the display channels of the display screen may be presented within the setup screen adjacent or otherwise in association with each display channel with the particular portion of the display screen that is represented by a respective display channel being highlighted, such as by being shaded as in the illustrated embodiment. As such, a user may utilize the information regarding the relative location of each display channel to associate the widgets with the respective display channels in a manner that will ultimately cause the user interface of the widgets to be presented in the manner desired by the user, such as by presenting the user interface of the highest priority widget in the center of the display screen and presenting the user interfaces of other widgets having a lower priority in other more peripheral locations of the display screen.

Figure 6:
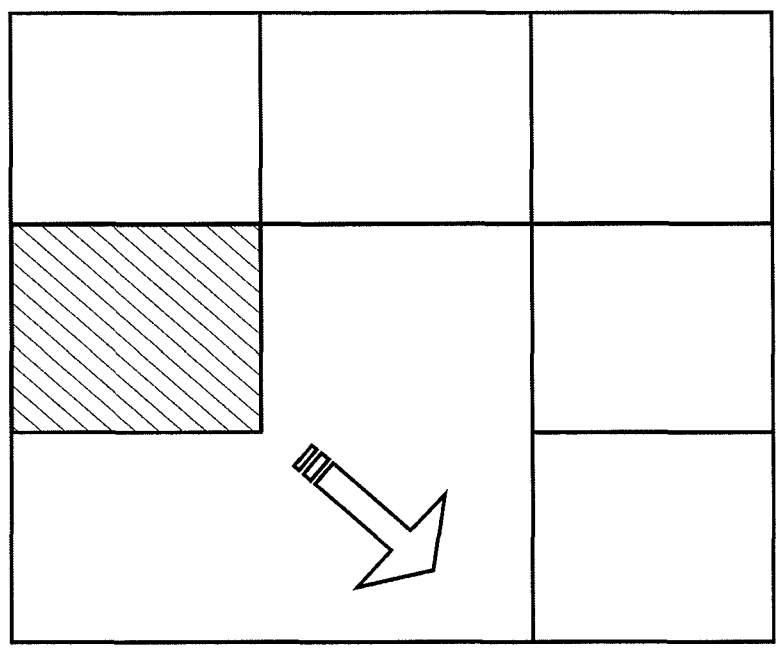
FIG. 6 is an enlarged representation of a graphical representation of the relative size and position of a plurality of display channels that further illustrates the resizing of a respective display channel in accordance with one example embodiment to the present invention.

As noted above, the setup screen may also be configured to provide a mechanism by which a user may adjust the size of one or more of the display channels. Although this size adjustment mechanism may be provided in various manners, the processor 20 of one embodiment provides a setup screen that graphically represents the relative location and size of each display channel and that associates this graphical representation with the display channels with the respective display channel being highlighted in some manner. The processor of this embodiment is also responsive to user input that provides instructions regarding resizing of a respective display channel. See operation 58 of FIG. 2. For example, a user may select the graphical representation of a respective display channel, such as a boundary or corner of the graphical representation of a respective display channel and may then drag the selected portion in such a manner as to enlarge or reduce the size of the graphical representation of the respective display channel relative to the graphical representations of the other display channels. Once the user has completed the resizing of the respective display channel, and thereafter has indicated that the setup process has been completed, the processor may store the information regarding the revised size of the respective display channel such that any subsequent presentation of the display screen includes the respective display channel as resized. In this regard, FIG. 6 provides an example embodiment in which a user selects the graphical representation of display channel 4 and moves a corner of the selected graphical representation outward so as to enlarge both the graphical representation of the respective display channel and the respective display channel itself upon the resulting display screen.

In the illustrated example embodiment, the graphical representation of a respective display channel is increased in size so as to include a portion of the display screen that has not previously been defined to include a display channel. However, other embodiments of the present invention permit the relative size of a display channel to be enlarged even in instances in which the entire display screen is subdivided into display channels with no unused or undefined portions. In this regard, the graphical representation of a respective display channel can be enlarged by user in the manner described above. However, since the entire display screen is included in one of the display channels, at least one of the other display channels must be reduced in size by an amount equal to that in which the selected display channel is enlarged. This reduction in size of at least one other display channel can be provided in various manners. For example, the processor 20 may reduce an adjacent display channel by an amount equal to the amount that the selected display channel was enlarged. Alternatively, each of the other display channels, that is, each of the display channels that were not enlarged, may be reduced by the processor by a proportionate amount such that the total reduction in size of the other display channels equals the extent of the enlargement of the selected display channel. Although exemplary techniques have been described for reducing the size of one or more display channels to offset the enlargement of a selected display channel, other embodiments of the method, apparatus and computer program product may offset the enlargement of a selected display channel in other manners. Additionally, the alteration in the size or placement of a display channel may be defined differently at different instances of time. For example, display channel 1 may be sized to be larger than display channel 2 in the morning, while display channel 2 may be sized to be larger than display channel 1 in the afternoon and evening.

As described, FIG. 2 is a flowchart of an apparatus, method and program product according to exemplary embodiments of the invention. It will be understood that each block or step of the flowchart, and combinations of blocks in the flowchart, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the user terminal and executed by a processor in the user terminal (e.g., the processor 20). As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart may support combinations of means for performing the specified functions, combinations of steps for performing the specified functions and program instruction means for performing the specified functions. It will also be understood that one or more blocks or steps of the flowchart, and combinations of blocks or steps in the flowchart, may be implemented by special purpose hardware-based computer systems which perform the specified functions or steps, or combinations of special purpose hardware and computer instructions.

In an exemplary embodiment, an apparatus for performing the method of FIG. 2 above may comprise a processor (e.g., the processor 20) configured to perform some or each of the operations (50-60) described above. The processor may, for example, be specifically configured to perform the operations (50-60) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 50-60 may comprise, for example, the processor 20 and/or an algorithm executed by the processor 20 for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing description and the associated drawings describe exemplary embodiments in the context of certain exemplary combinations of elements and/or functions, it should be appreciated that different combinations and variations of embodiments, elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus for configuration of a display screen, comprising:
   at least one processor; and
   at least one memory including computer program code,
   the at least one memory and the computer program code configured to, with the at least one processor, cause the apparatus to perform at least the following,
   receive a request to configure the display screen;
   provide for presentation of a setup screen to facilitate the configuration of the display screen, the setup screen defining a plurality of display channels and a time scale for the display channels;
   receive an indication of a user interface component configured to generate information to be presented in a respective display channel commencing at a respective time, wherein the user interface component comprises a widget; and
   provide for presentation of the display screen comprising the plurality of display channels and including information generated by the user interface component in the respective display channel commencing at the respective time,
   wherein the apparatus is mobile device.

2. An apparatus according to claim 1, wherein the processor is configured to receive an indication of the user interface component by receiving indications of one or more of user interface components to be presented in the same display channel commencing at different times.

3. An apparatus according to claim 1, wherein the processor is configured to provide for presentation of the display screen by providing for presentation of the display screen including information generated by the user interface component in the respective display channel commencing at the respective time and continuing until the information generated by the user interface component is replaced in the respective display channel by information generated by another user interface component.

4. An apparatus according to claim 1, wherein the processor is configured to receive an indication of the user interface component by receiving instructions for information generated by the user interface component to be repeatedly presented in the respective display channel at a predefined time interval, wherein the widget is associated with subsequent time periods of the same display channel until another widget is associated with a subsequent time period for the same display channel.

5. An apparatus according to claim 1, wherein the processor is configured to provide for presentation of the setup screen by, for each of the plurality of display channels, providing for presentation of a graphical representation of a location of the respective display channel upon the display screen.

6. An apparatus according to claim 5, wherein the processor is further configured to receive instructions to alter a size of a respective display channel upon the display screen, and wherein the processor is further configured to receive instructions to drag and drop the widget among two or more display channels.

7. An apparatus according to claim 6, wherein the processor is configured to receive instructions to alter a size of a respective display channel by receiving input via the setup screen altering the graphical representation of the location of the respective display channel.

8. A method comprising:
receiving, by a mobile device, a request to configure a display screen;
providing, by the mobile device, for presentation of a setup screen to facilitate the configuration of the display screen, the setup screen defining a plurality of display channels and a time scale for the display channels;
receiving, by the mobile device, an indication of a user interface component configured to generate information to be presented in a respective display channel commencing at a respective time, wherein the user interface component comprises a widget; and
providing, by the mobile device, for presentation of the display screen comprising the plurality of display channels and including information generated by the user interface component in the respective display channel commencing at the respective time.

9. A method according to claim 8, further comprising:
providing for presentation of a user interface having a highest priority in a center of the display screen; and
providing for presentation of one or more other user interfaces having lower priorities in peripherals of the display screen,
wherein the display screen is a home screen and one or more of the plurality of display channels represent one or more designated portions of the display screen.

10. A method according to claim 8, wherein receiving an indication of a user interface component comprises receiving indications of one or more user interface components to be presented in the same display channel commencing at different times.

11. A method according to claim 8, wherein providing for presentation of the display screen comprises providing for presentation of the display screen including information generated by the user interface component in the respective display channel commencing at the respective time and continuing until the information generated by the user interface component is replaced in the respective display channel by information generated by another user interface component.

12. A method according to claim 8, wherein receiving an indication of a user interface component comprises receiving instructions for information generated by the user interface component to be repeatedly presented in the respective display channel at a predefined time interval, wherein the widget is defined to a have a predefined duration with the respective display channel.

13. A method according to claim 8, wherein providing for presentation of the setup screen comprises, for each of the plurality of display channels, providing for presentation of a graphical representation of a location of the respective display channel upon the display screen.

14. A method according to claim 13 further comprising receiving instructions to alter a size of a respective display channel upon the display screen.

15. A method according to claim 14, wherein receiving instructions to alter a size of a respective display channel comprises receiving input via the setup screen altering the graphical representation of the location of the respective display channel.

16. A computer program product comprising at least one non-transitory computer-readable storage medium having computer-executable program instructions stored therein, the computer-executable program instructions comprising:
a program instruction configured to receive a request to configure a display screen;
a program instruction configured to provide for presentation of a setup screen to facilitate the configuration of the display screen, the setup screen defining a plurality of display channels and a time scale for the display channels;
a program instruction configured to receive an indication of a user interface component configured to generate information to be presented in a respective display channel commencing at a respective time, wherein the user interface component comprises a widget; and
a program instruction configured to provide for presentation of the display screen comprising the plurality of display channels and including information generated by the user interface component in the respective display channel commencing at the respective time,
wherein the computer-executable program instructions are executed by a mobile device.

17. A computer program product according to claim 16, wherein the indication of the user interface component includes instructions for the information generated by the user interface component to be repeatedly presented.

18. A computer program product according to claim 16, wherein the program instruction configured to receive an indication of a user interface component comprises program instructions configured to receive indications of one or more user interface components to be presented in the same display channel commencing at different times.

* * * * *